3,132,565
           CONTROL SYSTEM
Jean A. F. Roché, Reading, Ohio, assignor to General
  Electric Company, a corporation of New York
      Filed Dec. 26, 1961, Ser. No. 161,999
             2 Claims. (Cl. 91—171)

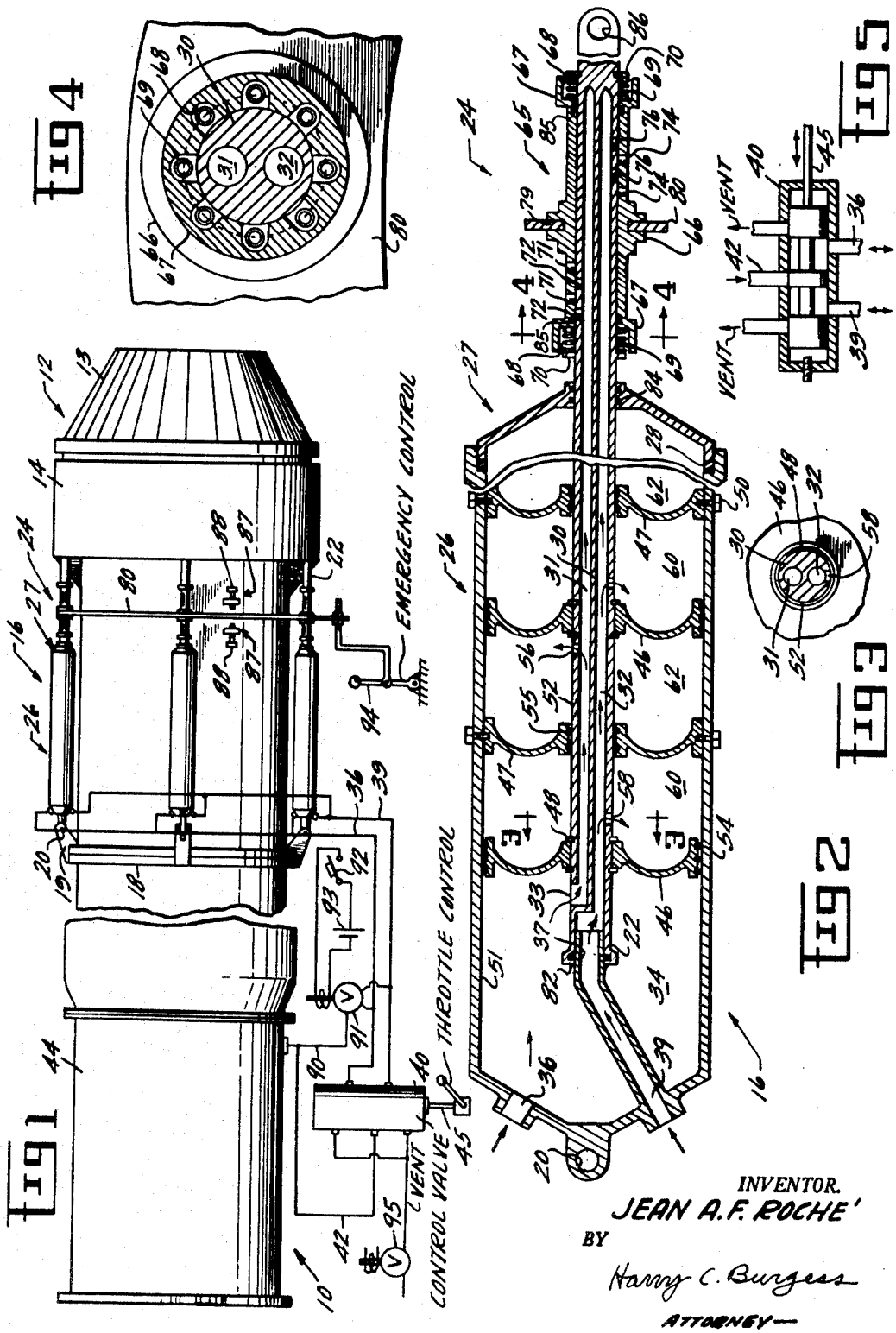

This invention relates to a control system and, more particularly, to a gas-operated control system adapted to cause movement of one, or more, jet exhaust diverting members of a reaction type engine, the control system including synchronization and stabilization means.

It is well known in the construction of aircraft having reaction type engines to include means for diverting the jet exhaust. For example, to achieve optimum performance of the engine over a wide range of flight conditions, there may be provided an exhaust nozzle having a series of flaps, or fingers, circularly arranged at the nozzle exit, or two series of flaps arranged coaxially, such as is shown in the patent to Schaeffer—2,969,641—of common assignment. In addition, advanced reaction type engine designs frequently provide thrust reversing means which deflect the jet exhaust gas stream so as to provide braking during flight, landing, or taxiing of the aircraft. Such thrust reversing means usually employ blocker doors which are positioned to close off the normal discharge path of the exhaust jet or which insert turning vanes or diverter valves to deflect the exhaust jet radially outward and forward. Other examples of movable members for use in aircraft, in particular, would include flight control surfaces.

Obviously, some means must be provided to achieve the necessary movement of these fingers, flaps, blocker doors, control surfaces, and the like. Commonly, hydraulic actuation systems have been utilized. Such systems usually employ one or more hydraulic actuators requiring hydraulic fluid under high pressure. The use of such system, of course, requires a high pressure pump, a supply of hydraulic fluid, drain connections, reliable fluid-tight seals, and high pressure fluid-tight hoses or conduits. Use of the hydraulic systems has, in the past, been accompanied by hydraulic nozzle actuator failures, seal leakage, hydraulic fluid loss, and/or rapid wear of the synchronizing mechanisms used, if any, because of the high fluid pressures and actuating forces associated with such systems. Further, the use of hydraulic fluid presents a fire hazard which would be particularly undesirable for use in supersonic aircraft, wherein at high altitudes and high flight speeds the ambient temperatures frequently exceed the flash point of the fluid normally utilized in the hydraulic system. Also, at these high temperatures, the hydraulic fluid may break down to form hard scale deposits which destroy sliding seals. This has resulted in the system being completely disabled when the hydraulic fluid supply is lost through leakage. Moreover, the weight of the entire hydraulic system is relatively high, due to the requirement for high pressure components, and weight is a critical factor in the design of supersonic engine systems. Furthermore, if it is deemed necessary to provide an emergency actuation system, because of the many problems involved with use of a hydraulic system, a sizeable weight and cost penalty is incurred, particularly since emergency provisions must be made for all significant failure modes.

Accordingly, it is an object of the present invention to provide an improved gas-operated control system for use with movable members.

A further object of the present invention is to provide an improved gas-operated control system for use with movable members including means for synchronizing movement in said control system.

A further object of the present invention is to provide an improved gas-operated control system having means to maintain positional synchronization between a plurality of actuators.

A further object of the present invention is to provide an improved gas-operated control system wherein a relatively low force level positional input is required to maintain a positional relationship between movable members in the system.

A further object of the invention is to provide an improved gas-operated control system for use with a reaction type engine wherein the system working gas loss is kept to a minimum.

Another object of the invention is to provide an improved gas-operated control system for use with a movable member wherein a minimum volume of working gas is required to establish, or maintain, the position of the movable member.

A further object of the invention is to provide an improved gas-operated control system for use with a movable member including means for stabilizing movement in said control system.

A further object of the invention is to provide an improved control system having gas-operated piston actuators, which system has a maximum resistance to position change caused by load changes on the actuator piston rods.

A further object of the present invention is to provide an improved gas-operated control system for use with movable members of a reaction type engine, the system including means for synchronizing and stabilizing actuators thereof, the system being of simple, economic, and lightweight construction and having a high degree of safety to facilitate its use in a high temperature environment.

Briefly, in one embodiment of the invention, there is provided for use with a variable area jet engine exhaust nozzle having a shroud member and a plurality of flaps connected thereto, a control system including a plurality of pneumatic motor means, each of the motor means having a movable actuating member including a first passageway and a second passageway, control means having a source of pressurized air connected thereto, the control means admitting, or releasing, air to the passageways, selectively, to move the movable actuating members in opposite directions, and means interconnecting the motor means and synchronizing the movement of the actuating members including sleeve members slidably mounted on the actuating members, each sleeve member having a plurality of ports adapted to register with like ports in the associated movable actuating member in flow communication with the movable actuating member passageways. Biasing means for positioning the sleeve members so that the ports are normally closed and a synchronizing member rigidly secured to each of the sleeve members are also provided, the synchronizing member and sleeve members cooperating with the biasing means to correct axial misalignment of the movable actuating members and dampen oscillations in the control system.

The features of the invention which are believed to be novel are set forth with particularity in the appended claims. However, the invention both as to organization and method of operation, together with further objects and advantages thereof, may be better understood by reference to the following detailed description when taken in conjunction with the accompanying drawings in which:

FIGURE 1 is an external view of a reaction type engine, partially broken away, illustrating a variable area jet exhaust nozzle and an embodiment of the gas-operated control system of the present invention for use therewith;

FIGURE 2 is an enlarged side view, partially in cross section, of one of the motor means of the embodiment of my improved control system illustrated in FIGURE 1;

FIGURE 3 is a view taken along line 3—3 of FIGURE 2;

FIGURE 4 is a view taken along line 4—4 of FIGURE 2; and

FIGURE 5 is a view of a control for use in my improved gas-operated control system.

Referring now more particularly to the drawings, indicated at numeral 10 in FIGURE 1 is a jet engine having a variable area nozzle, indicated generally at 12, mounted at the exhaust end thereof. The nozzle includes a plurality of movable flaps, or fingers, 13 pivotally mounted on an axially translatable shroud 14, in a known manner. Indicated generally at 16 are a plurality of motor means, or actuators. The motor means, or actuators, 16 are adapted to be supported on the engine by an annular support member 18 having a plurality of brackets 19 to which the motor means 16 may be secured by a pivot joint, as indicated at 20. As seen in FIGURE 1, each of the motor means includes a movable actuating member, or rod, 22 which is adapted to be secured to the shroud 14, in a known manner. Indicated generally at 24 is a synchronizing and stabilizing means which is a feature of the improved gas-operated control system of the subject invention. It will be understood that while a jet engine variable area nozzle is used for purposes of illustration, that the invention will be equally useful for actuating a movable member wherever a source of gas under pressure is available and the objectives of the invention are desirable.

Referring now to FIGURE 2, wherein the motor means, indicated generally at 16, are shown in greater detail, it will be seen that each motor means includes a main body portion indicated generally at 26 and a cap portion, indicated generally at 27. The cap portion may be removably secured to the body portion by a threaded connection, including a gasket, or seal, 28 providing a gastight joint, or the cap and body portions can be permanently joined, as by welding or brazing. Indicated generally at 22 is the aforementioned movable actuating member which, in the embodiment shown, is in the form of a piston rod for a pneumatic motor. The piston rods of the pneumatic motor means 16 are movable axially of the engine so as to translate the shroud member 14, which varies the nozzle area, as described. Each movable rod, or actuating member, includes a passage 31 and a passage 32. In flow communication with passage 31 is an entry port 33 connected to a chamber 34 at the supply end of the motor means 16. A port is provided in the chamber 34, the port being connected to a supply line, or conduit, 36. On the other hand, passage 32 in the piston rod is connected to a hollow support member 37 providing a flow passage to a second port which likewise connects to a supply line 39.

As will be seen in FIGURE 1, lines 36 and 39 are connected to a control means, or valve, 40, which, in turn, is supplied with a source of high pressure gas through a conduit 42 connected, in the embodiment shown, to the compressor section 44 of the jet (reaction) engine. Thus, high pressure, or compressor discharge air, may be bled off in a normal manner and supplied to the control valve which will duct the high pressure air either to line 36, or line 39, in a manner best illustrated by FIGURE 5, depending on the position of a throttle control, or similar device, actuated by the aircraft operator and adapted to move a piston 45 in the control valve. Note that the high pressure air from conduit 42 is admitted by an initial movement of piston 45 which connects line 42 to line 36 or line 39, depending on whether movement of the piston is to the left or right in the drawing.

Referring again to FIGURE 2, it will be seen that the body portion 26 of the motor means 16 is divided into a plurality of chambers by means of annular partitions, or walls, 46 and 47. The partitions, or walls, are annular in cross section to better enable them to withstand the pressure of the air supplied thereto. Walls 46 are secured at 48 to the piston rod 22, whereas walls 47 are secured to the body portion 26 at 50. Thus, the walls 46 are movable relative to the body portion, being carried on the piston rod, whereas the walls 47 are movable only with respect to the rod 22, since they are affixed to the body portion 26 of the motor means. The inner surface 51 of the body portion of the motor means and the outer surface 52 of the movable rod, respectively, cooperate with seal means 54 and 55 on the walls 46 and 47, respectively, for gastight operation. It will be noted that passages 31 and 32 are provided with openings, or ports, 56 and 58, respectively, each port 58 leading to a chamber 60 and each port 56 leading to a chamber 62. It will therefore be realized that the main body portion of the motor means 16 comprises alternating annular pressure chambers having walls adapted to move relative to each other, which chambers are in flow communication with either port 35 or port 38 in the supply end of the body portion of the motor means. Therefore, in accordance with one of the features of my invention, after the initial movement of piston 45 in control valve means 40 has taken place, to connect, for example, line 42 with line 36 (or 39), if normal system air leakage is insufficient to provide the desired rate of nozzle flap adjustment, further movement of the piston 45 will vent line 39 (or 36) so as to further increase the pressure differential across wall 46 in the desired direction. Thus, with high gas pressure applied, at the outset, to both sides of the chamber walls 46 and 47, the system can achieve a resistance to load changes (i.e., changes in the pressure differential across the walls), or "stiffness," which approaches that of a hydraulic system, but without the aforementioned disadvantages of the latter system. Further, the amount of "stiffness" can be varied by the control valve 40 bleeding more, or less, high pressure air, sequentially, with application of high pressure air to the other side of the piston wall.

Referring now to the rod end of the motor means 16, there is provided the synchronizing and stabilizing means which is another of the features of my improved gas-operated control system. The synchronizing and stabilizing means shown includes a position equalizing, or sleeve member, indicated generally at 65, adapted to fit over the movable actuating member, or connecting rod, 22 of each motor means 16. In the embodiment shown, each sleeve member includes a raised center portion, or collar, 66 and enlarged end portions 67—67. Each of the enlarged end portions includes a plurality of cavities 68, each of which is adapted to receive a centering and stabilizing spring 69, as perhaps best seen in FIGURE 4. Integral with, or affixed to the movable actuating member 22, are a plurality of stop means 70 which are located opposite the springs 69 so as to cause the springs to be retained in the cavities 68 in both ends of the sleeve member. Intermediate the collar portion and one of the end portions are a pair of vent, or relief, ports 71—71 in the sleeve member. These ports are adapted to be placed in flow communication with a pair of like ports 72—72 in the piston rod, the latter ports being in flow communication with the passageway 31. Similarly, between the collar portion and the other end of the sleeve member are a second pair of vent, or relief, ports 74—74 adapted to register with like ports 76—76 in the rod, the latter ports being in flow communication with the passageway 32. The collar portion of each sleeve member also contains a slot 79 which closely engages a synchronizing member, or ring 80. As seen in FIGURE 1, the ring 80 is in a plane perpendicular to the axis of the engine 10. Thus, being a rigid annular member, the ring will operate to hold each of the sleeve members 65 in a plane perpendicular to the engine axis, i.e., in axial alignment.

With each piston rod, or movable actuating member, 22 slidably supported at 82 and at 84, in the motor means body portion 26, and with the sleeve members, in turn, slidably supported by means of seals 85 on the piston rods, which are, in turn, connected to the shroud 14 at 86, it is obvious that movement of these connecting rods 22, will cause movement of the shroud. Axial movement, or translation of the shroud will, in turn, cause the flap members 13 to pivot radially outward, or radially inward. Thus, by extension or retraction of the movable actuating member 22, variation of the exhaust area is accomplished, in the embodiment shown. In other embodiments, thrust reverses blocker doors or control surfaces, for example, could similarly be actuated. Therefore, in operation, assume that the movable member 22 is to be extended. Air (or gas), under pressure, will already be in the system and supplied to the chambers 62 and 60. Piston 45, in response to a signal from the throttle control, will move to the left so as to direct air of increased pressure to line 36 connected to the supply end of motor means 16. This higher pressure air is ducted through chamber 34, port 33, passageway 31 and port (or ports) 56 in the piston rod 22, and, finally, into the annular chamber (or chambers) 62. The pressure in chamber 62 will thereby be increasing relative to the pressure in the adjacent chambers 60, which at this point is at the original steady state pressure sufficient to maintain the rod in the retracted position. Thus, chamber walls 46 will move (to the right in FIGURE 2), since the annular wall 47 is rigidly attached to the body portion 26 which, in turn, is rigidly attached to the engine, extending the rods to set a new jet nozzle area. When the new area satisfies the requirements imposed on the system by the engine operating conditions, the control will maintain the newly required pressure differential between chamber 62 and chamber 60 so as to hold this new nozzle position against the forces acting on the nozzle flap. While the described operation will extend the rod, retraction is accomplished in a similar manner by introducing higher pressure air through the line 39, by movement of the piston 45 to the right. Thus, air of increased pressure will be transmitted through the tube support 37, the passage 32, and into the chamber (or chambers) 60 through port (or ports) 58. The reaction to the increasing pressure in chamber 60 will be opposite to that described above wherein the increase in pressure occurred in the chamber 62, i.e., the movement of the annular wall 46 is now to the left, or towards the supply end of the motor means. This causes the connecting rods 22 to move toward the retracted position and when the flaps 13 have reached the desired position, the rod ceases to move.

The next feature to be described is means for synchronizing, and stabilizing, the plurality of pneumatic actuators, or motor means, 16 shown in the present embodiment. The synchronizing and stabilizing means includes an annular member, or ring, 80 which is attached to the sleeve members 65 of each of the motor means. The ring is connected to the collar portion 66 of each sleeve so as to align all the sleeve members relative to a plane perpendicular to the duct axis. Therefore, assuming a larger pressure differential across the chamber 62 (or 60) in one actuator 16 relative to the others, this would result in the piston rod 22 of this actuator being forced temporarily beyond the position of the piston rods, or movable actuating members of the other actuators. The ring 80, however, will tend to maintain the position of the sleeve member of this actuator in the same vertical plane as the sleeve members of the other actuators, thus forcing the sleeve member of this actuator to move along the movable member 22 which will compress the springs 69 at one end of the sleeve. This movement will cause the vent ports 71—71 (or 74—74) in the sleeve member to come into registry with ports 72—72 (or 76—76) in the movable member which will place passageway 31 (or 32) in flow communication with the atmosphere. This will vent the pressure in the chamber (or chambers) 62 (or 60) and change the pressure differential across wall 46 in a direction to cause the rod 22 to exert more, or less force in the right direction. This will cause the connecting rod to line up axially with the connecting rods of the other actuators. In other words, the pressure differential across the wall 46 in this actuator will be more, or less, than that in the other actuators and in such a direction as to restore axial alignment.

The centering springs 69, while aiding the synchronization action, also operate to reduce self-oscillation in the ring 80 due to sudden movement of the moveable members 22, thus assuring that uncontrolled oscillations of the rods and the ring assembly will not occur. The natural frequency of the ring and sleeve member assembly, including the centering springs is selected so that it will not resonate with or match the fundamental, or first or second order harmonic frequencies of the masses connected to the actuator rods and the spring factor of the air column in the pneumatic actuators. Thus, the time-phase relationship of the displacement of the actuator rods and the ring will cause ports 71—71 and 72—72 (or 74—74 and 76—76) to open, bleeding air from chambers 62 (or 60) to reduce the velocity of the rod 22, thereby assuring stable operation since rapid motion is damped and, further, unstable oscillations of the synchronizing means cannot produce a self-excited, rapid oscillatory motion of the actuator rod 22. Thus, the synchronizing means is also a stabilizing means and, obviously, either the spring rate or the mass of sleeve and ring assembly may be varied to secure the desired relationship of frequencies needed to stabilize the system. Optimum control of the synchronization, and stabilization, may be facilitated by particular attention being paid to the size and shape of the vent ports 74—74 and 71—71, which will help to control the accuracy of the alignment of the sleeve members and prevent unwanted oscillations and movement of the ring 80. Obviously, one of the sleeve members 65 could be rigidly affixed to a rod of one of the motor means 16 so as to provide a "master" rod which would assume a predetermined position. The sleeve members of the other motor means would then be "free-floating" and would automatically line up with the master rod sleeve member position by reason of being attached to the ring 80.

Referring again to FIGURE 1, means may be provided in the form of lugs 87 attached to the engine and having threaded holes through which travel limiting adjusting screws 88 pass, the screws being disposed so as to contact ring 80 and limit movement of the rods 22. In other words, contact with the screws by ring 80 will displace sleeve 65 with respect to rod 22, thereby bringing into alignment ports 71—71 and 72—72 (or 74—74 and 76—76), thus bleeding air from chambers 62 (or 60) so that the travel of each rod 22 is limited to a portion of its full stroke, if desired. In addition, an emergency, or fail safe, means may be provided to actuate the motor means 16, in the event the control valve 40 should fail. The emergency means may include a high pressure line 90 from the compressor connected through a solenoid operated valve 91 to conduits 36 and 39. The valve 91 may be operated by a switch 92, connected to a power source 93. When switch 92 is energized, control of the system is by the emergency control lever 94. At the same time, another solenoid 95 closes the vent tubes to the control valve 40.

It is intended that other modifications and variations of the present invention, as disclosed and described herein, such as will occur to those skilled in the art shall be covered by the claims appended hereto.

What I desire to claim and secure by Letters Patent is:

1. A gas-operated control system for movable members comprising:
   a plurality of gas-operated motor means;
   control means having a source of pressurized gas connected thereto, said control means being in flow communication with said motor means and including a valve member selectively supplying a high pressure gas to and releasing high pressure gas from said motor means; and synchronizing and stabilizing means for said control system, said synchronizing and stabilizing means including,
- (a) a sleeve member movable relative to each of said motor means,
- (b) biasing means for each of said sleeve members, said biasing means being operable to counteract said relative movement of said sleeve members,
- (c) and a synchronizing member inter-connecting said sleeve members, said synchronizing member connecting axial misalignment of said relatively movable sleeve members, said synchronizing member, sleeve members and biasing means cooperating to dampen oscillations in said control system.

2. A control system for use with a plurality of movable fluid-flow diverting members, said system comprising:

a plurality of gas-operated motor means, each of said motor means including;
- (a) an elongated translating member operatively connected at one end to a source of pressurized gas and at the other end to the fluid-flow diverting members,
- (b) a first passageway in said translating member for ducting said pressurized gas to a first chamber in said motor means to cause said translating member to move in one direction,
- (c) a second passageway in said translating member for ducting said pressurized gas to a second chamber to cause said translating member to move oppositely of said one direction;

control means for said motor means having a source of pressurized gas connected thereto, said control means including a valve operable to selectively supply the gas to said first passageway or said second passageway while sequentially releasing gas from said second passageway or said first passageway, respectively; and means synchronizing and stabilizing the movement of said elongated translating members, said means including,
- (a) a sleeve member slidably mounted on the translating member, said sleeve member including a first vent port adapted to register with a like port in said translating member in flow communication with said first passageway to relieve the pressure of the gas moving the translating member in said one direction, and a second vent port adapted to register with another like port in said translating member in flow communication with said second passageway to relieve the pressure of the gas moving the translating member in the opposite direction,
- (b) biasing means supported on said translating member, said biasing means stabilizing the position of the sleeve member so that said first and second vent ports are normally closed, and
- (c) a synchronizing ring interconnecting the sleeve members, said ring operating to correct axial misalignment of the elongated translating members by movement of one or more of said sleeve members for venting of said ports to change the pressure differential in said first and second chambers, said biasing means cooperating with the sleeve members and ring to dampen oscillations in said control system.

References Cited in the file of this patent

UNITED STATES PATENTS

| | | |
|---|---|---|
| 825,866 | Rogers | July 10, 1906 |
| 2,365,040 | Averill | Dec. 12, 1944 |
| 2,376,320 | Butrovich | May 22, 1945 |
| 2,380,973 | Kopp | Aug. 7, 1945 |
| 2,546,596 | Haines | Mar. 27, 1951 |
| 2,688,313 | Bauer | Sept. 7, 1954 |
| 2,698,605 | Kress | Jan. 4, 1955 |
| 2,744,381 | Geisel | May 8, 1956 |
| 2,932,161 | Geary | Apr. 12, 1960 |